United States Patent
Tsunematsu et al.

(10) Patent No.: US 10,486,982 B2
(45) Date of Patent: Nov. 26, 2019

(54) INFRARED ABSORBING FINE PARTICLES, DISPERSION LIQUID USING THE SAME, DISPERSION BODY, LAMINATED TRANSPARENT BASE MATERIAL, FILM, GLASS, AND METHOD FOR PRODUCING THE SAME

(71) Applicant: SUMITOMO METAL MINING CO., LTD., Tokyo (JP)

(72) Inventors: Hirofumi Tsunematsu, Isa (JP); Kenji Fukuda, Isa (JP); Kenichi Fujita, Isa (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 0 days.

(21) Appl. No.: 15/765,230

(22) PCT Filed: Sep. 20, 2016

(86) PCT No.: PCT/JP2016/077758
§ 371 (c)(1),
(2) Date: Mar. 30, 2018

(87) PCT Pub. No.: WO2017/057110
PCT Pub. Date: Apr. 6, 2017

(65) Prior Publication Data
US 2018/0282175 A1   Oct. 4, 2018

(30) Foreign Application Priority Data
Sep. 30, 2015 (JP) .................. 2015-194838

(51) Int. Cl.
*C01G 30/00* (2006.01)
*C08K 3/22* (2006.01)
(Continued)

(52) U.S. Cl.
CPC ........... *C01G 30/002* (2013.01); *C01G 19/00* (2013.01); *C08G 63/00* (2013.01); *C08K 3/22* (2013.01);
(Continued)

(58) Field of Classification Search
CPC combination set(s) only.
See application file for complete search history.

(56) References Cited

FOREIGN PATENT DOCUMENTS

| JP | H07-257922 A | 10/1995 |
|----|---|---|
| JP | 2003-176132 A | 6/2003 |

(Continued)

OTHER PUBLICATIONS

May 8, 2019 European Search Report issued in European Patent Application No. 16851284.6.
A.R. Babar et al.: "Effect of intermittent time on structural, optoelectronic, luminescence properties of sprayed antimony doped tin oxide thin films"; Journal of Analytical and Applied Pyrolysis, vol. 112, Jan. 28, 2015, p. 214-220.
D.W. Kim et al.: "Preparation of hard agglomerates free and weakly agglomerated antimony doped tin oxide (ATO) nanoparticles by coprecipitation reaction in methanol reaction medium", Materials Chemistry and Physics, Elsevier, vol. 97, No. 2-3, Jun. 10, 2006, p. 452-457.
(Continued)

*Primary Examiner* — Bijan Ahvazi
(74) *Attorney, Agent, or Firm* — Oliff PLC

(57) ABSTRACT

ATO infrared absorbing fine particles having high coloring property (high light absorption property) which has both excellent dispersibility and solar radiation shielding properties and can reduce a use amount of ATO infrared ray absorbing fine particles can be provided, wherein crystal lattice constant a is 4.736 Å or more and 4.743 or less, crystal lattice constant c is 3.187 Å or more and 3.192 Å or less, and a crystallite size is 5.5 nm or more and 10.0 nm or less, which are analyzed by an X-ray diffraction measurement result.

19 Claims, 1 Drawing Sheet

(51) Int. Cl.
*C09D 17/00* (2006.01)
*G02B 5/20* (2006.01)
*C01G 19/00* (2006.01)
*C09D 201/00* (2006.01)
*C09K 3/00* (2006.01)
*C08L 101/00* (2006.01)
*C09D 7/40* (2018.01)
*C08G 63/00* (2006.01)
*C09D 5/32* (2006.01)
*C09D 167/00* (2006.01)
*G02B 5/22* (2006.01)

(52) U.S. Cl.
CPC .......... *C08K 3/2279* (2013.01); *C08L 101/00* (2013.01); *C09D 5/32* (2013.01); *C09D 7/40* (2018.01); *C09D 17/007* (2013.01); *C09D 167/00* (2013.01); *C09D 201/00* (2013.01); *C09K 3/00* (2013.01); *G02B 5/208* (2013.01); *C01P 2002/60* (2013.01); *C01P 2002/76* (2013.01); *C01P 2004/62* (2013.01); *C01P 2004/64* (2013.01); *C01P 2006/40* (2013.01); *C01P 2006/60* (2013.01); *C08K 2003/2282* (2013.01); *C08K 2201/005* (2013.01); *G02B 5/22* (2013.01)

(56) References Cited

FOREIGN PATENT DOCUMENTS

| | | |
|---|---|---|
| JP | 2004-075510 A | 3/2004 |
| JP | 2004-083397 A | 3/2004 |
| JP | 2008-230954 A | 10/2008 |
| WO | 2013/147029 A1 | 10/2013 |
| WO | 2013/147033 A1 | 10/2013 |

OTHER PUBLICATIONS

Hui Huang et al.: "Solvothermal synthesis of Sb:SnO2 nanoparticles and IR shielding coating for smart window", Materials & Design, vol. 88, Sep. 8, 2015, p. 384-389.

Dahl et al., "Flame Spray Pyrolysis of Electrode Materials for Energy Applications," Mater. Res. Soc. Symp. Proc., 2015, vol. 1747.

Bernardi et al., "Development of metal oxide nanoparticles by soft chemical method," Ceramics International, 2009, vol. 35, pp. 463-466.

Nov. 1, 2016 International Search Report issued in International Patent Application No. PCT/JP2016/077758.

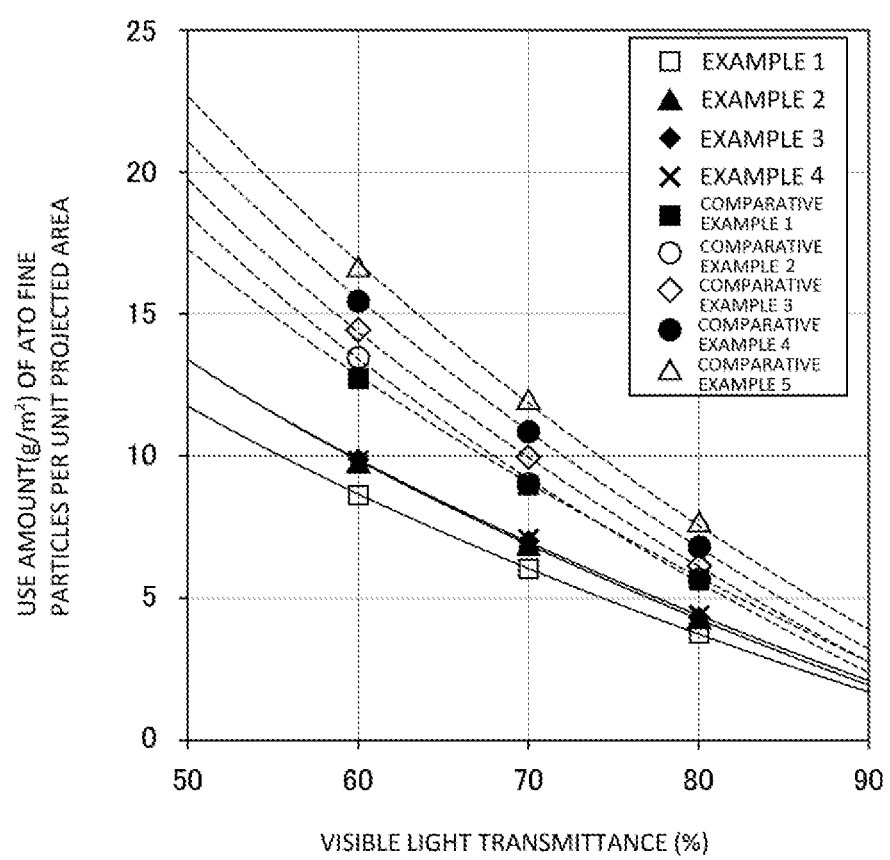

INFRARED ABSORBING FINE PARTICLES, DISPERSION LIQUID USING THE SAME, DISPERSION BODY, LAMINATED TRANSPARENT BASE MATERIAL, FILM, GLASS, AND METHOD FOR PRODUCING THE SAME

TECHNICAL FIELD

Antimony-containing tin oxide infrared absorbing fine particles having a solar radiation shielding function used for vehicles, buildings, offices, general houses, windows of telephone boxes, roofs of carports, show windows, lighting lamps, transparent cases, etc., and a dispersion liquid, a dispersion body, laminated transparent substrates, films, glasses using the same.

DESCRIPTION OF RELATED ART

Solar radiation shielding materials that remove and reduce infrared rays that greatly contribute to a thermal effect in sunlight and transmit visible light, have attracted attention as energy-saving materials. Among them, the dispersion body of conductive fine particles has a high merit such as excellent solar radiation shielding properties, low cost, radio wave transmittance, and high weather resistance. Among them, antimony-containing tin oxide (sometimes referred to as "ATO" in the present invention) infrared absorbing fine particles have a relatively low visible light reflectance, and therefore they do not give glaring appearance to the transparent base material. Further, the dispersion body of the ATO infrared absorbing fine particles has a color close to colorless, and therefore it has been used as a window material for vehicles and buildings requiring design.

For example, patent document 1 discloses as follows: a solar radiation shielding glass is obtained by applying a solar radiation shielding coating liquid obtained by dispersing ATO infrared absorbing fine particles in a silazane polymer solution, and firing this glass.

Further, the present applicant also discloses in patent document 2, ATO infrared absorbing fine particles for solar radiation shielding, which is capable of forming a solar radiation shielding film having optical properties that a haze value is low while having high visible light transmittance and low solar radiation transmittance.

Meanwhile, the present applicant discloses in patent document 3, a method for producing a solar radiation shielding material having high visible light transmittance, low solar radiation transmittance and low haze value.

Further, the present applicant also discloses in patent document 4, physical properties of the ATO infrared absorbing fine particles capable of exhibiting optical properties such as high visible light transmittance, low solar radiation transmittance, and low haze value, when formed on a transparent base material or in a transparent base material, and also discloses ATO infrared absorbing fine particles having the above physical properties and a dispersion liquid containing the ATO infrared absorbing fine particles and capable of forming a solar radiation shielding dispersion body by a simple coating method or a kneading method, and a solar radiation shielding dispersion body containing the ATO infrared absorbing fine particles having the above physical properties.

Further, the present applicant also discloses in patent document 5, as follows: ATO infrared absorbing fine particles having excellent crushability and excellent dispersibility in a medium stirring mill can be produced, with a fired product not in a lumpy strong aggregate state, by wet-treating a filtration-washed product of a hydroxide containing tin and antimony using an alcohol solution, and drying it thereafter, to thereby produce a precursor of ATO infrared absorbing fine particles, and firing this precursor, when attempting to produce a solar radiation shielding material dispersion liquid for forming a solar radiation shielding dispersion body using the ATO infrared absorbing fine particles.

By utilizing the abovementioned prior art, ATO infrared absorbing fine particles capable of exhibiting optical properties such as high visible light transmittance, low solar radiation transmittance and low haze, can be produced at low cost. Then, the ATO infrared absorbing fine particles have excellent crushability and excellent dispersibility in a medium stirring mill. As a result, the solar radiation shielding material dispersion liquid for forming a solar radiation shielding dispersion body can also be produced at low cost, and by using this dispersion liquid, the solar radiation shielding dispersion body can be formed by a simple application method or a kneading method. Accordingly, it is considered that a total production cost of the dispersion body using the ATO infrared absorbing fine particles, the laminated transparent base material, the film and the glass can be reduced.

PRIOR ART DOCUMENT

Patent Document

Patent Document 1: Japanese Patent Application Laid-Open No. 1995-257922
Patent Document 2: Japanese Patent Application Laid-Open No. 2003-176132
Patent Document 3: Japanese Patent Application Laid-Open No. 2004-75510
Patent Document 4: Japanese Patent Application Laid-Open No. 2004-83397
Patent Document 5: Japanese Unexamined Patent Publication No. 2008-230954

SUMMARY OF THE INVENTION

Problem to be Solved by the Invention

However, according to the study of the present inventors, for the optical properties of the ATO infrared absorbing fine particles in the above documents, evaluation by solar radiation transmittance (or solar radiation shielding property) standardized by a predetermined visible light transmittance is performed, and evaluation standardized by a use amount of the ATO infrared absorbing fine particles is not performed.

Therefore, the present inventors study on the total production cost of the dispersion body using the ATO infrared absorbing fine particles, the laminated transparent base material, the film, and the glass, from a viewpoint of the use amount of the ATO infrared absorbing fine particles.

Then, it is found that in a conventional technique, in order to prepare a coating layer having a visible light transmittance of 70%, it is necessary to contain the ATO infrared absorbing fine particles in an amount of $9.0 \text{ g/m}^2$ or more per unit projected area, and therefore the production cost when standardized by the use amount of the ATO infrared absorbing fine particles is never low.

Namely, it is found by the present inventors, that when the ATO dispersion body is used in a low transmittance area or in a case of a mass production, a required use amount of the ATO infrared absorbing fine particles is increased and the production cost of the dispersion body becomes high. Further, in recent years, it is expected that a cost of a raw material of ATO will soar along with a rise in value due to a rarity of rare metal, and reduction of the production cost is a subject now.

Further, when the ATO dispersion body is produced by applying it on glass or film, it is difficult to control the layer thickness of the ATO coating layer because it is necessary to have the ATO dispersion liquid with high concentration and high viscosity.

The present invention is made under the abovementioned circumstances, and in order to solve the abovementioned problem, an object of the present invention is to provide ATO infrared absorbing fine particles having excellent dispersibility and excellent solar radiation shielding properties, and capable of reducing the use amount of the ATO infrared absorbing fine particles, an ATO infrared absorbing fine particle dispersion liquid, a dispersion body using the same, laminated transparent base materials, films, glasses and a method for producing the same.

Means for Solving the Problem

In order to solve the abovementioned problem, the present inventors study on ATO infrared absorbing fine particles having excellent dispersibility, excellent solar radiation shielding properties, and capable of reducing the use amount of the ATO infrared absorbing fine particles, and a dispersion liquid using the same, a dispersion body, a laminated transparent base material, a film, a glass, and a method for producing the same.

Then, it is found that the ATO infrared ray absorbing fine particles contained in the solar radiation shielding body have an interference effect with incident light such as an interaction with visible light and infrared light which are incident lights through absorption and emission effect of light caused by an electronic state of powder particles, and the like, to thereby cause an optical phenomena such as transmission, absorption, and reflection.

Meanwhile, it is also found that in a case of composite oxide fine particles such as ATO infrared absorbing fine particles, fine particles having various physical properties can be prepared based on a surface state and an electronic state of the fine particles, depending on the conditions for its production.

Based on these ideas, the present inventors study on a relationship between the ATO infrared absorbing fine particles having various physical properties and a solar shielding function.

As a result, it is found by the present inventors, that when the fine particles of ATO have a crystal lattice constant in a specific range and have a crystallite size in a specific range, the ATO infrared absorbing fine particles have excellent dispersibility, excellent solar radiation shielding properties, and it is also found that there is a phenomenon that an amount of ATO infrared absorbing fine particles required for developing a desired solar radiation shielding property can be made extremely low. Further, it is also found that a green compact of the ATO infrared absorbing fine particles has a volume resistivity in a predetermined range.

In the present invention, a required use amount of the ATO infrared absorbing fine particles for exhibiting desired solar radiation shielding properties is described as "high or low of coloring power" in some cases. Namely, in a case of the ATO infrared absorbing fine particles, which may require less use amount to develop desired solar radiation shielding properties, they are "ATO infrared absorbing fine particles with high coloring power." (In the present invention, they are described as "ATO with high coloring power" in some cases).

Further, it is also found by the present inventors, that the ATO infrared absorbing fine particles having the abovementioned crystal lattice constant in the specific range, the crystallite size in the specific range, and the volume resistivity in the predetermined range can be obtained by controlling an antimony concentration in the mixture of an antimony compound and a tin compound which is a precursor of the ATO infrared ray absorbing fine particles before firing, a temperature condition for generating the precursor, and a firing condition for firing the precursor, and based on this knowledge, the present invention is completed.

Namely, in order to solve the abovementioned problem, a first invention is infrared absorbing fine particles, which are ATO fine particles having a crystal lattice constant a being 4.736 Å or more and 4.743 Å or less, a crystal lattice constant c being 3.187 Å or more and 3.192 Å or less, and a crystallite size being 5.5 nm or more and 10.0 nm or less.

A second invention is the infrared absorbing fine particles of the first invention, wherein the crystallite size is 6.0 nm or more and 9.0 nm or less.

A third invention is the infrared absorbing fine particles of the first or second invention, wherein in the ATO fine particles, Sn element is contained in a concentration of 66.0 mass % or more and 70.0 mass % or less and Sb element is contained in a concentration of 8.0 mass % or more and 9.0 mass % or less.

A fourth invention is the infrared absorbing fine particles of any one of the first to third aspects, wherein a value obtained by a volume resistivity measurement performed to a green compact of the ATO fine particles is 0.05 Ω·cm or more and 0.35 Ω·cm or less.

A fifth invention is an infrared absorbing fine particle dispersion liquid which is a dispersion liquid in which the infrared absorbing fine particles of any one of the first to fourth inventions are dispersed in a liquid medium, and the liquid medium is selected from water, an organic solvent, an oil and fat, a liquid resin, a plasticizer in a liquid state, or a mixture thereof.

A sixth invention is the infrared absorbing fine particle dispersion liquid of the fifth invention, wherein a dispersed particle size of the infrared absorbing fine particles contained in the infrared absorbing fine particle dispersion liquid is 1 nm or more and 110 nm or less.

A seventh invention is the infrared absorbing fine particle dispersion liquid of the fifth or sixth invention, wherein a content of the infrared absorbing fine particles contained in the infrared absorbing fine particle dispersion liquid is 1 mass % or more and 50 mass % or less.

An eighth invention is the infrared absorbing fine particle dispersion liquid of any one of the fifth to seventh inventions, wherein when the infrared absorbing fine particle dispersion liquid is diluted with the liquid medium or concentrated by removing the liquid medium so that a visible light transmittance is 70%, a solar radiation transmittance is 40% or more and 50% or less and infrared absorbing fine particles of 5.0 g/m$^2$ or more and 7.0 g/m$^2$ or less per unit projected area are contained.

A ninth invention is an infrared absorbing fine particle dispersion body, containing the infrared absorbing fine particles of any one of the first to fourth inventions and a thermoplastic resin.

A tenth invention is the infrared absorbing fine particle dispersion body of the ninth invention, wherein the thermoplastic resin is any one of one resin selected from a group such as polyethylene terephthalate resin, polycarbonate resin, acrylic resin, styrene resin, polyamide resin, polyethylene resin, vinyl chloride resin, olefin resin, epoxy resin, polyimide resin, fluororesin, ethylene • vinyl acetate copolymer, and polyvinyl acetal resin, or a mixture of two or more resins selected from the above resin group, or copolymers of two or more resins selected from the above resin group.

An eleventh invention is the infrared absorbing fine particle dispersion body of the ninth or tenth invention, wherein the infrared absorbing fine particles are contained in an amount of 0.01 mass % or more and 25 mass % or less.

A twelfth invention is the infrared absorbing fine particle dispersion body of any one of the ninth to eleventh inventions, wherein the infrared absorbing fine particle dispersion body has a sheet shape, a board shape or a film shape.

A thirteenth invention is the infrared absorbing fine particle dispersion body of any one of the ninth to twelfth inventions, wherein infrared absorbing fine particles are contained in an amount of 5.0 g/m$^2$ or more and 7.0 g/m$^2$ or less per unit projected area, the infrared absorbing fine particles being formed as a dispersion body having a solar radiation transmittance of 42% or more and 52% or less when its visible light transmittance is 70%.

A fourteenth invention is an infrared absorbing laminated transparent base material, wherein the infrared absorbing fine particle dispersion body of any one of the ninth to thirteenth inventions is present between a plurality of transparent base materials.

A fifteenth invention is an infrared absorbing film or an infrared absorbing glass, having a coating layer on at least one side of a transparent base material selected from a transparent film base material or a transparent glass base material, wherein the coating layer is a binder resin containing the infrared absorbing fine particles of any one of the first to fourth inventions.

A sixteenth invention is the infrared absorbing film or the infrared absorbing glass of the fifteenth invention, wherein the binder resin is a UV curable resin binder.

A seventeenth invention is the infrared absorbing film or the infrared absorbing glass of the fifteenth or sixteenth invention, wherein a thickness of the coating layer is 1 μm or more and 10 μm or less.

An eighteenth invention is the infrared absorbing film of any one of the fifteenth to seventeenth inventions, wherein the transparent film base material is a polyester film.

A nineteenth invention is the infrared absorbing film or the infrared absorbing glass of any one of the fifteenth to eighteenth inventions, wherein a content of the infrared absorbing fine particles contained in the coating layer per unit projected area is 5.0 g/m$^2$ or more and 7.0 g/m$^2$ or less.

A twentieth invention is a method for producing infrared absorbing fine particles, including:

dropping an alcohol solution in which an antimony compound is dissolved and an alkaline solution in parallel into a solution of a tin compound having a liquid temperature of 60° C. or more and less than 70° C., to thereby generate and precipitate a hydroxide containing tin and antimony;

repeating decantation on the precipitate and washing it until conductivity of a supernatant liquid of a washing liquid in the decantation becomes 1 mS/cm or less;

placing the washed precipitate into the alcohol solution and stirring it to thereby perform wet-treatment so as to obtain a wetted product;

drying the wet-treated product to thereby obtain an ATO infrared absorbing fine particle precursor; and heating the ATO infrared absorbing fine particle precursor at 700° C. or more and less than 850° C. in an air atmosphere and firing it for 1 hour or more and 5 hours or less to thereby obtain ATO infrared absorbing fine particles.

A twenty-first invention is the method for producing infrared absorbing fine particles of the twentieth invention, wherein in the generating and precipitating the hydroxide containing tin and antimony, a solution of 100 parts by weight of a tin compound in terms of tin (IV) oxide and an alcohol solution in which 9.0 parts by weight or more and 11.0 parts by weight or less of an antimony compound is dissolved in terms of element of antimony are dropped in parallel, into the alkaline solution having a liquid temperature of 60° C. or more and less than 70° C.

Advantage of the Invention

According to the present invention, ATO infrared absorbing fine particles having both excellent dispersibility and excellent solar radiation shielding properties, capable of reducing a use amount of ATO infrared absorbing fine particles, having high coloring properties (high light absorption), and an infrared absorbing fine particle dispersion liquid, an infrared absorbing fine particle dispersion body, an infrared absorbing laminated transparent base material, and the like, using the ATO infrared absorbing fine particles can be obtained.

BRIEF DESCRIPTION OF THE DRAWINGS

FIG. 1 is a graph showing a relationship between a use amount of ATO fine particles per unit projected area and a visible light transmittance.

DETAILED DESCRIPTION OF THE INVENTION

Embodiments of the present invention will be described in detail hereafter, in an order of 1. ATO infrared absorbing fine particles, 2. Method for producing ATO infrared absorbing fine particles, 3. ATO infrared absorbing fine particle dispersion liquid, 4. ATO infrared absorbing fine particle dispersion body, 5. A sheet-like or film-like ATO infrared absorbing fine particle dispersion body, 6. Infrared absorbing laminated transparent base material, and 7. Infrared absorbing film • infrared absorbing glass.

1. ATO Infrared Absorbing Fine Particles

In the ATO infrared absorbing fine particles of the present invention, crystal lattice constant a is 4.736 Å or more and 4.743 Å or less, crystal lattice constant c is 3.187 Å or more and 3.192 or less Å, more preferably, the crystal lattice constant a is 4.738 Å or more and 4.742 Å or less, the crystal lattice constant c is 3.188 Å or more and 3.191 Å or less, and a crystallite size is 5.5 nm or more and 10.0 nm or less, more preferably 6.0 nm or more and 9.0 nm or less.

More preferably, it is an ATO infrared absorbing fine particle containing Sn element in a concentration of 66.0 mass % or more and 70.0 mass % or less and Sb element in a concentration of 8.0 mass % or more and 9.0 mass % or less.

Then, it is preferable to compress the ATO infrared absorbing fine particles at a pressure of 37.5 Mpa or more and 39.0 Mpa or less to thereby obtain a green compact, wherein when a volume resistivity is measured by a DC four-terminal method, a value is 0.05 Ω·cm or more and 0.35 Ω·cm or less.

ATO infrared absorbing fine particle dispersion body formed by using the dispersion liquid in which the ATO infrared absorbing fine particles are dispersed in a solvent with a dispersed particle size of 1 to 110 nm, exhibits desired solar radiation shielding properties.

A crystal lattice constant of the ATO infrared absorbing fine particles is controlled by a doping amount of antimony into tin oxide crystal in the ATO infrared absorbing fine particles. Specifically, when the doping amount of antimony is decreased, the crystal lattice constant is decreased, and when the doping amount of antimony is increased, the crystal lattice constant is increased. Namely, when the doping amount of antimony is increased or decreased, the optical properties of the ATO infrared absorbing fine particles are affected. Accordingly, by strictly controlling the doping amount of antimony, parameters of the crystal lattice constant can be strictly controlled.

When the crystal lattice constant of the ATO infrared absorbing fine particles of the present invention is within the abovementioned specified value range, excellent solar radiation shielding properties and coloring power can be secured.

Since the crystallite size of the ATO infrared fine particles has a close relationship with an electron density of the particles, it is important to control in the same manner as the abovementioned crystal lattice constant. Specifically, when the ATO infrared absorbing fine particle precursor is prepared by parallel dropping, a liquid temperature at the time of parallel dripping must be kept within a range of 60° C. or more and less than 70° C. so that a particle size of the precursor becomes uniform. Further, a firing temperature when firing the precursor must also be in a range of 700° C. or more and less than 850° C.

When the crystallite size of the ATO infrared absorbing fine particles is larger than a lower limit in the above defined range, the electron density of the particles becomes preferable, and the coloring power of the fine particles is secured. In contrast, when it is smaller than the abovementioned upper limit in the above defined range, the infrared absorption property becomes preferable and the solar radiation shielding property is secured.

The abovementioned method for measuring the crystal lattice constant and crystallite size includes a powder X-ray diffraction method, a single crystal structure analysis method, a transmission electron beam diffraction method, and the like. However, when a measurement sample is a powder and the crystallite size of the measurement sample is 100 nm or less like the ATO infrared absorbing fine particle of the present invention, it is desirable to select the powder X-ray diffraction method which is a relatively simple measurement method. For example, by measuring an XRD pattern of the measurement sample by θ-2θ method for a powder XRD apparatus and analyzing by WPPF (Whole Powder Pattern Fitting) method to obtain the crystal lattice constant and the crystallite size, the crystal lattice constant and the crystallite size can be measured with high accuracy.

As described above, the element concentration of the ATO infrared absorbing fine particles is closely related to the doping amount of antimony, and therefore it is important to control the parameters similarly to the crystal lattice constant. The contained element concentration is preferably as follows: Sn element is 66.0 to 70.0 mass %, Sb element is 8.0 to 9.0 mass %, and more preferably, Sn element is 67.0 to 69.0 mass %.

Meanwhile, the value of the volume resistivity in the green compact of the ATO infrared absorbing fine particles is closely related to the electron density of the fine particles. The fine particles is compressed at a pressure of 37.5 to 39.0 Mpa to obtain a green compact, and a value obtained by measuring a volume resistivity by the DC four-terminal method while applying the pressure to the green compact is preferably 0.05 to 0.35 Ω·cm, and more preferably 0.10 to 0.30 Ω·cm. However, the value of the volume resistivity of the green compact is varied depending on a molding pressure of the green compact, and therefore for example as described above, it is preferable to unify the pressure within a range of 37.5 to 39.0 Mpa and compare the samples by making a measurement method uniform.

In the present invention, 2 to 3 g of the ATO infrared absorbing fine particles are packed in a cylinder to form a cylindrical sample having a diameter of 20.0 mm and a thickness of 2.5 mm to 4.0 mm, and the sample is compressed from an axial direction at a load of 11.8 to 12.2 kN and a pressure of 37.5 to 39.0 MPa to obtain a green compact, and while applying the pressure, the volume resistivity in the green compact of the ATO infrared absorbing fine particles is measured by the DC four-terminal method. At this time, the density of the green compact is 2.0 to 3.5 g/cc.

2. Method for Producing the ATO Infrared Absorbing Fine Particles

An example of a method for producing the ATO infrared absorbing fine particles for shielding solar radiation according to the present invention will be described below.

First, an alcohol solution in which an antimony compound is dissolved and an alkaline solution are dropped in parallel, into the solution of the tin compound whose liquid temperature is 60° C. or more and less than 70° C., or a tin compound solution and an alcohol solution in which the antimony compound is dissolved are dropped in parallel into an alkaline solution whose liquid temperature is 60° C. or more and less than 70° C.

Then, by either of these parallel drops, hydroxide which is the precursor of fine particles containing tin and antimony is produced and precipitated. HCl may be previously added to the solution of the tin compound.

From a viewpoint of desired optical properties, the addition amount of antimony compound into the tin compound solution is preferably 9.0 to 11.0 parts by weight, more preferably 9.5 to 10.5 parts by weight in terms of element of antimony based on 100 parts by weight in terms of tin (IV) oxide. With this addition amount, it is possible to prepare the ATO infrared absorbing fine particles in which Sn element is 66.0 to 70.0 mass % and Sb element is 8.0 to 9.0 mass %. The tin compound and the antimony compound to be used are not particularly limited, and for example, tin chloride, tin nitrate, tin sulfide, antimony chloride, antimony bromide and the like can be used.

Examples of the alkaline solution used as the abovementioned precipitant include aqueous solutions of ammonium hydrogen carbonate, aqueous ammonia, sodium hydroxide, potassium hydroxide and the like, and particularly ammonium hydrogen carbonate and aqueous ammonia are preferable. Then, the alkaline concentration of the alkaline solution may be not less than a chemical equivalent required for the tin compound and the antimony compound to be hydroxide, but it is preferably tripled from equivalent, to equivalent.

The parallel dropping time of the alcohol solution and the alkali solution or the parallel dropping time of the solution of the tin compound and the alcohol solution is preferably 0.5 minutes or more and 60 minutes or less, and preferably 30 minutes or less, from a viewpoint of the particle size of the precipitated hydroxide and productivity.

Stirring of the aqueous solution is continued so as to make the inside of a system homogenous even after completion of the dropwise addition. The temperature of the aqueous solution at that time is the same as the temperature at the time of parallel dropping and is set to 60° C. or more and 70° C. or less.

The liquid temperature is set to 60° C. or more and less than 70° C. during continuous stirring of the aqueous solution, for precipitating the hydroxide in which the ratio of tin to antimony is homogeneous, with a comparatively uniform particle size. By setting the liquid temperature to 60° C. or more, the composition of the precipitated hydroxide becomes homogeneous, and the ATO infrared absorbing fine particles having homogeneous antimony doping amount can be prepared when the hydroxide precursor is later fired. As a result, the solar radiation shielding property and the coloring power of the ATO infrared absorbing fine particles are secured.

Further, by setting the liquid temperature to less than 70° C., evaporation of the solvent is suppressed, and change of the concentration of the tin oxide and the antimony compound in the system is also suppressed. As a result, the particle size of the precipitated hydroxide becomes uniform, and the ATO infrared absorbing fine particles having uniform crystallite size were produced when the hydroxide precursor was later fired, and the solar radiation shielding property and the coloring power of the ATO infrared absorbing fine particles are secured.

Duration of the stirring is not particularly limited, but from a viewpoint of productivity, it is 0.5 minutes or more, preferably 30 minutes or less, and more preferably 15 minutes or less.

Next, decantation is repeated on the precipitate. Washing is performed until the conductivity of the supernatant liquid of the washing solution in the decantation becomes 1 mS/cm or less and filtering is performed. When concentration of impurities such as chlorine ion and sulfate ion remaining in the precipitate are 1.5 mass % or less, solid solution of antimony to tin oxide is not inhibited in the firing step, and desired optical properties are ensured. Therefore, it is preferable to perform sufficient washing and filtering until the conductivity of the supernatant liquid of the washing liquid in the decantation becomes 1 mS/cm or less. When the conductivity of the supernatant liquid is 1 mS/cm or less, the amount of impurities remaining in the precipitate can be reduced to 1.5 mass % or less.

Next, the washed precipitate is subjected to wet-treatment with an alcohol solution to thereby obtain a wet-treated product, and then dried. Here, as the alcohol solution used for the wet-treatment, it is also preferable to use the alcohol solution containing one or more elements selected from Si, Al, Zr and Ti in an amount of less than 15 mass % in terms of oxide.

This is because by adopting this structure, oxides of one or more elements selected from Si, Al, Zr and Ti exist independently in the vicinity of the antimony-containing tin oxide, and a particle growth of the antimony-containing tin oxide during firing can be suppressed. When the content of the element in terms of oxide is less than 15 mass %, a ratio of antimony-containing tin oxide contained in the ATO infrared absorbing fine particles is ensured, and therefore the solar radiation shielding property is secured.

Then, the obtained precursor is fired to thereby obtain antimony-containing tin oxide fine particles of the present invention. At this time, the concentration of the alcohol solution is preferably 50 mass % or more. This is because when the concentration of the alcohol solution is 50 mass % or more, it is possible to prevent the antimony-containing tin oxide fine particles from becoming lumpy strong aggregates.

Here, the alcohol to be used in the alcohol solution is not particularly limited, but alcohol having excellent solubility in water and having a boiling point of 100° C. or less is preferable. For example, methanol, ethanol, propanol, and tert-butyl alcohol can be used.

The wet-treatment may be performed by charging the precipitate filtered and washed into the alcohol solution and stirring, and the time and a stirring speed at this time may be appropriately selected according to a treatment amount. The amount of the alcohol solution at the time of charging the precipitate into the alcohol solution may be any amount as long as it is capable of securing the flowability that allows easy stirring and precipitating. The stirring time and the stirring speed are appropriately selected on condition that the precipitate including a partially aggregated portion at the time of filtration-washing is uniformly mixed until there is no aggregate.

Further, the wet-treatment may be usually performed at room temperature, but it is of course also possible to perform the wet-treatment while warming the precipitate and the alcohol solution to such an extent that alcohol is not evaporated and lost, if necessary. Preferably, by heating at a temperature below a boiling point of alcohol, it is possible to prevent alcohol from evaporating and being lost during the wet-treatment, resulting in lost of the effect of the wet-treatment. When the wet-treated product is dried after alcohol is evaporated and lost during the wet-treatment and the effect of the wet-treatment is lost, it becomes a strong aggregate, and this is not preferable.

After the wet-treatment, the wet-treated product is heated and dried in a state of being wet with alcohol. The drying temperature and the drying time of the wet-treated product are not particularly limited. After the wet-treatment, the wet-treated product does not become a strong aggregate even if it is dried, and therefore the drying temperature and the drying time may be appropriately selected depending on conditions such as the treatment amount of the wet-treated product and treatment equipment. By the drying treatment, an ATO infrared absorbing fine particle precursor subjected to the wet-treatment is obtained.

Then, by heating the ATO infrared absorbing fine particle precursor which has undergone the wet-treatment, to 600° C. or more in the air atmosphere and firing it for 1 hour to 5 hours, preferably for 2 hours to 5 hours, the ATO infrared absorbing fine particles of the present invention are produced. By further heating to 700° C. or more in the firing, antimony can be sufficiently dissolved in tin oxide, the lattice constant a can be 4.736 to 4.743 Å, and the lattice constant c can be 3.187 to 3.192 Å, and this is preferable. Meanwhile, by performing the firing so as not to exceed 850° C., coarsening of the crystallite size of the ATO infrared absorbing fine particles can be avoided, and the crystallite size is from 5.5 to 10.0 nm, preferably from 6.0 to 9.0 nm, which is preferable because it is possible to obtain the ATO infrared absorbing fine particle dispersion liquid or dispersion body having high coloring power as described later. From the abovementioned viewpoint, the range of the firing temperature is preferably 700° C. or more and less than 850° C.

3. ATO Infrared Absorbing Particle Dispersion Liquid

The ATO infrared absorbing fine particle dispersion liquid of the present invention is obtained by pulverizing the ATO infrared absorbing fine particles obtained by the above production method, and simultaneously dispersing the pulverized ATO infrared absorbing fine particles in water, an organic solvent, an oil and fat, a liquid resin, a plasticizer in a liquid state, a liquid medium of a mixed slurry selected from a mixture of the above materials, and an appropriate amount of a dispersant, a coupling agent, and a surfactant, etc., in a medium stirring mill. Further, a dispersion state of the fine particles in the dispersion liquid is good, and the dispersed particle size thereof is 1 to 110 nm. Further, the amount of the ATO infrared absorbing fine particles contained in the ATO infrared absorbing fine particle dispersion liquid is 1 mass % or more and 50 mass % or less. Further, when a visible light transmittance is set to 70% by dilution with the liquid medium or by concentration by removing the liquid medium, it is possible to contain the ATO infrared absorbing fine particles having a solar transmittance of 40% or more and 50% or less, and in an amount of 5.0 to 7.0 $g/m^2$ per unit projected area.

The solvent used for the ATO infrared absorbing fine particle dispersion liquid is not particularly limited, and may be appropriately selected according to a coating condition of the ATO infrared absorbing fine particle dispersion liquid, a coating environment, and an inorganic binder and a resin binder which are suitably added. Water, organic solvents, oils and fats, liquid resins, plasticizers in a liquid state, or mixtures thereof can be given for example. Further, as the organic solvent, various ones such as alcohol type, ketone type, hydrocarbon type, glycol type, water type and the like can be selected. Specifically, alcoholic solvents such as methanol, ethanol, 1-propanol, isopropanol, butanol, pentanol, benzyl alcohol, diacetone alcohol and the like; ketone type solvents such as acetone, methyl ethyl ketone, methyl propyl ketone, methyl isobutyl ketone, cyclohexanone, isophorone and the like; ester solvents such as 3-methyl-methoxy-propionate; glycol derivatives such as ethylene glycol monomethyl ether, ethylene glycol monoethyl ether, ethylene glycol isopropyl ether, propylene glycol monomethyl ether, propylene glycol monoethyl ether, propylene glycol methyl ether acetate, propylene glycol ethyl ether acetate and the like; Amides such as formamide, N-methylformamide, dimethylformamide, dimethylacetamide, N-methyl-2-pyrrolidone and the like; aromatic hydrocarbons such as toluene and xylene; and ethylene chloride, and chlorobenzene, etc., can be used. Then, among these organic solvents, isopropyl alcohol, ethanol, 1-methoxy-2-propanol, dimethyl ketone, methyl ethyl ketone, methyl isobutyl ketone, toluene, propylene glycol monomethyl ether acetate, n-butyl acetate and the like are particularly preferable.

As the fats and oils, vegetable fats and oils or vegetable-derived fats and oils are preferable. As the vegetable oils, drying oils such as linseed oil, sunflower oil, tung oil and eno oil, semidrying oils such as sesame oil, cottonseed oil, rapeseed oil, soybean oil, rice bran oil, poppy seed oil and the like, non-drying oils such as olive oil, coconut oil, palm oil, dehydrated castor oil, can be preferably used.

As the vegetable oil-derived compound, fatty acid monoesters and ethers obtained by direct esterification reaction of fatty acid of vegetable oil and monoalcohol are preferably used.

Further, commercially available petroleum-based solvents can also be used as fats and oils, and Isopar E, Exxsol Hexane, Exol Heptane, Exol E, Exol D30, Exol D40, Exol D60, Exol D80, Exol D95, Exol D110, Exol D130 (all of them are manufactured by Exon Mobil Corporation), and the like can be used as preferable examples.

The solvents described above can be used alone or in combination of two or more. Further, if necessary, pH may be adjusted by adding acid or alkali to these solvents.

Further, in order to further improve a dispersion stability of the ATO infrared absorbing fine particles in the ATO infrared absorbing fine particle dispersion liquid and avoid coarsening of the dispersed particle size by reaggregation, it is also preferable to add various dispersants, surfactants, coupling agents and the like. The dispersant, the coupling agent and the surfactant can be selected according to the application, but it is preferable to have a group containing an amine, a hydroxyl group, a carboxyl group, or an epoxy group as a functional group. These functional groups are adsorbed on the surfaces of the ATO infrared absorbing fine particles to prevent aggregation and have an effect of uniformly dispersing the ATO infrared absorbing fine particles of the present invention even in an infrared absorbing film.

By applying the infrared absorbing fine particle dispersion liquid onto a transparent base material or kneading it in a base material by an appropriate method, it is possible to form an ATO infrared absorbing fine particle dispersion body having an optical property that a haze value is low while having high visible light transmittance and low solar radiation transmittance.

The method for dispersing the ATO infrared absorbing fine particles in the dispersion liquid is not particularly limited as long as it is a method capable of uniformly dispersing the fine particles in the dispersion liquid without agglomerating them. Examples of the dispersion method include a pulverization/dispersion treatment method using a device such as a bead mill, a ball mill, a sand mill, a paint shaker, an ultrasonic homogenizer, or the like. Among them, it is more preferable to use media stirring mills such as a bead mill, a ball mill, a sand mill, or a paint shaker in which media (beads, beer, ottawa sand) is used, because pulverization/dispersion to a desired particle size is possible for a short time. Through pulverization/dispersion treatment using these devices, formation of the fine particles is accelerated due to collision of the ATO infrared absorbing fine particles and collision of grinding media against the fine particles simultaneously with the dispersion of the ATO infrared absorbing fine particles in the dispersion liquid, and the ATO infrared absorbing fine particles can be finely pulverized and dispersed (namely, they are pulverized and dispersed).

When the dispersed particle size is 1 to 110 nm, light with a wavelength of 380 nm to 780 nm in a visible light region is not scattered by geometric scattering or Mie scattering, and therefore Haze is reduced and a visible light transmittance can be increased, which is preferable. Further, in a Rayleigh scattering region, the scattered light is decreased in inverse proportion to the particle size of the sixth power, and therefore when the dispersed particle size is decreased, scattering is reduced and transparency is improved. Therefore, when the dispersed particle size is 110 nm or less, the scattered light becomes very small, which is preferable because the transparency is increased.

Here, the dispersed particle size of the ATO infrared absorbing fine particles in the ATO infrared absorbing fine particle dispersion liquid will be briefly described. The dispersed particle size of the ATO infrared absorbing fine particles means the particle size of a single particle of the ATO infrared absorbing fine particles dispersed in a solvent, or the particle size of aggregated particles which are aggregate of the ATO infrared absorbing fine particles, and can be measured with various commercially available particle size distribution meters. For example, the particle size can be measured by a method based on a principle of dynamic light scattering method in which a sample of the ATO infrared absorbing fine particle dispersion liquid is collected, the sample is irradiated with a laser, and stokes diameter (hydrodynamic diameter) is obtained from fluctuation of scattered light of laser scattered by the ATO infrared absorbing fine particles. The stokes diameter obtained by this dynamic light scattering method corresponds to the dispersed particle size in the present invention.

Further, the ATO infrared absorbing fine particle dispersion liquid in which the content of the ATO infrared absorbing fine particles obtained by the abovementioned production method is 1 mass % or more and 50 mass %, is excellent in liquid stability. When an appropriate liquid medium, dispersant, coupling agent, surfactant is selected, gelation of the dispersion liquid and sedimentation of particles do not occur for 6 months or more even when placed in a constant temperature bath at a temperature of 40° C., and the dispersed particle size can be maintained in a range of 1 to 110 nm.

Further, when ATO infrared fine particles are produced by the above production method, the content of the ATO infrared absorbing fine particles can be reduced as compared with other ATO fine particle production methods. Namely, when the ATO infrared absorbing fine particle dispersion liquid is diluted with the liquid medium or concentrated by removing the liquid medium so that the visible light transmittance is 70%, the solar radiation transmittance is 40% or more and 50% or less, and the content of the ATO infrared absorbing fine particle per unit projected area at that time is 5.0 to 7.0 g/m$^2$. "The content per unit projected area" means a weight (g) of the infrared absorbing fine particles contained in a thickness direction per unit area (m$^2$) through which light passes, in the infrared absorbing fine particle dispersion liquid of the present invention.

One or more kinds selected from inorganic binders and resin binders can be contained in the ATO infrared absorbing fine particle dispersion liquid as appropriate. The type of the inorganic binder and the resin binder contained in the ATO infrared absorbing fine particle dispersion liquid is not particularly limited, and metal alkoxides of silicon, zirconium, titanium or aluminum, partial hydrolytic condensation products thereof, or an organosilazane can be used as the inorganic binder, and thermoplastic resin such as acrylic resin, thermosetting resin such as epoxy resin, etc., can be used as the resin binder.

Further, in order to improve the solar radiation shielding property of the ATO infrared ray absorbing fine particle dispersion body of the present invention, it is also acceptable to suitably add as needed boride particles expressed by a general formula XBm (wherein X is a metal element selected from alkaline earth elements or rare earth elements including yttrium, satisfying 4≤m≤6.3), fine particles of tungsten oxide expressed by a general formula WyOz (wherein W is tungsten, O is oxygen, satisfying 2.0<z/y<3.0), and/or fine particles of composite tungsten oxide expressed by a general formula MxWyOz (M is one or more elements selected from H, He, alkali metal, alkaline earth metal, rare earth element, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, and Re, W is tungsten, O is oxygen, satisfying 0.001≤x/y≤1, 2.0<z/y≤3.0), in the dispersion liquid of the present invention. The addition ratio at this time may be appropriately selected according to a desired solar radiation shielding property.

The ATO infrared absorbing fine particle dispersion body in which the ATO infrared absorbing fine particle dispersion liquid is applied as a coating layer on the transparent base material, has a layer structure in which the ATO infrared absorbing fine particles are deposited on the base material. This layer exhibits a solar radiation shielding effect as it is. However, in the production step of the abovementioned ATO infrared absorbing fine particle dispersion liquid, it is also preferable to add one or more kinds selected from the inorganic binder and the resin binder at the time of dispersion of the ATO infrared absorbing fine particles. This is because by adding the binder to the ATO infrared absorbing fine particle dispersion liquid, conductivity can be controlled by increasing or decreasing the addition amount of the binder in the ATO infrared absorbing fine particle dispersion body to be produced, and adhesion of the ATO infrared absorbing fine particles on the base material after coating and curing is improved, and there is an effect of further improving hardness of the layer.

The types of the inorganic binder and the resin binder are not particularly limited. However, a metal alkoxide of silicon, zirconium, titanium or aluminum, a partial hydrolysis and polycondensation product thereof, or an organosilazane can be used as the inorganic binder, and ultraviolet curing resin, room temperature curing resin and thermoplastic resin such as acrylic resin, and thermosetting resin such as epoxy resin and the like can be used as the resin binder.

Further, it is also a preferable structure that by applying a coating liquid containing an alkoxide containing at least one of silicon, zirconium, titanium, and aluminum and/or a partially hydrolyzed polycondensation product of the alkoxide, on the layer, followed by heating, and forming a coating layer of an oxide containing at least one of silicon, zirconium, titanium, and aluminum on the layer, to thereby obtain a multilayer structure. This is because by adopting such a structure, a coated component is deposited while filling the gaps in which the ATO infrared absorbing fine particles are deposited as the first layer, and in order to suppress refraction of the visible light, the haze value of the layer is further reduced, and the visible light transmittance is improved, and further, the adhesion of the ATO infrared absorbing fine particles on the base material is improved. Here, as a method for forming a coating layer including an alkoxide containing at least one of silicon, zirconium, titanium, and aluminum and partial hydrolysis and polycondensation products thereof, on the layer made of the ATO infrared absorbing fine particles alone or mainly composed of the ATO infrared absorbing fine particles, the coating method is convenient from a viewpoint of ease of layer forming operation and cost.

The coating liquid used in the coating method is obtained by containing alkoxide containing one or more kinds of silicon, zirconium, titanium, and aluminum, or one or more partial hydrolytic condensation polymerized products of the alkoxide, in the solvent such as water or alcohol. The content thereof is preferably 40 mass % or less in terms of oxide in the coating obtained after heating. Further, it is also preferable to adjust pH by adding an acid or an alkali as necessary. An oxide coating layer of silicon, zirconium, titanium, aluminum or the like can be easily formed by applying the coating liquid as a second layer on a layer mainly composed of the ATO infrared absorbing fine particles followed by heating. In addition, it is also preferable to use an organosilazane solution as a component of the binder component or the coating liquid used in the coating liquid of the present invention.

The ATO infrared ray absorbing fine particle dispersion liquid and the coating method using the coating liquid according to the present invention are not particularly limited. For example, a method for uniformly applying a treatment liquid flatly and thinly, such as a spin coating method, a bar coating method, a spray coating method, a dip coating method, a screen printing method, a roll coating method, flow coating, or the like, can be preferably used.

Further, for example, when a resin is used as a base material and the abovementioned ATO infrared absorbing fine particles or ATO infrared absorbing fine particle dispersion liquid is kneaded into the resin, any known method may be appropriately selected as long as the ATO infrared absorbing fine particles are uniformly dispersed in the resin. Further, it can be mixed and melt at a temperature near the melting point of the resin, pelletized, and molded into various shapes such as plate, sheet, and layer, etc. by each known method. Examples of the resin include a PET resin, an acrylic resin, a polyamide resin, a vinyl chloride resin, a polycarbonate resin, an olefin resin, an epoxy resin, a polyimide resin, and a fluororesin.

The substrate heating temperature after coating of (coating の後には coating する「場所」が来るため coating としました。) the ATO infrared absorbing fine particle dispersion liquid containing a metal alkoxide of silicon, zirconium, titanium, or aluminum and a hydrolyzed polymer thereof as an inorganic binder or a coating layer is preferably performed at 100° C. or more and further preferably at the boiling point of the solvent in the coating liquid. This is because when the substrate heating temperature is 100° C. or more, the polymerization reaction of the metal alkoxide contained in the coating layer or the hydrolyzed polymer of the metal alkoxide can be completed. Further, this is because when the substrate heating temperature is 100° C. or more, water or an organic solvent as a solvent does not remain in the layer, and therefore in the layer after heating, these solvents do not cause reduction of the visible light transmittance.

When the resin binder is added to the ATO infrared absorbing fine particle dispersion liquid, the resin binder may be cured according to each resin curing method. For example, if the resin binder is an ultraviolet curable resin, ultraviolet rays may be appropriately irradiated, and if the resin binder is a room temperature setting resin, it may be left as it is after coating. By adopting this structure, coating on an existing window glass or the like, is possible on site.

4. ATO Infrared Absorbing Fine Particle Dispersion Body

The ATO infrared absorbing fine particle dispersion body of the present invention is characterized by including the ATO infrared absorbing fine particles obtained by the abovementioned production method and a thermoplastic resin. Further, it is preferable that the thermoplastic resin is one or more resins selected from a resin group such as polyethylene terephthalate resin, polycarbonate resin, acrylic resin, styrene resin, polyamide resin, polyethylene resin, vinyl chloride resin, olefin resin, epoxy resin, polyimide resin, fluororesin, ethylene • vinyl acetate copolymer, polyvinyl acetal resin, or a mixture of two or more resins selected from the above resin group, or copolymers of two or more resins selected from the above resin group.

Further, the ATO infrared absorbing fine particle dispersion body of the present invention contains 0.01 mass % or more and 25 mass % or less of the ATO infrared ray absorbing fine particles obtained by the abovementioned production method. Further, the ATO infrared absorbing fine particle dispersion body may be formed into a sheet shape, a board shape or a film shape. Further, when the visible light transmittance of the ATO infrared absorbing fine particle dispersion body is set to 70%, it is possible to contain the ATO infrared absorbing fine particles of 5.0 to 7.0 g/m$^2$ per unit projected area and having a solar radiation transmittance of 42% or more and 52% or less. The infrared absorbing fine particle dispersion body can be applied to various uses by processing it into a sheet shape, a board shape or a film shape.

Hereinafter, a method for producing the ATO infrared absorbing fine particle dispersion body will be described.

By mixing the ATO infrared absorbing fine particle dispersion liquid of the present invention and a plasticizer and thereafter removing the solvent component, it is possible to obtain a dispersed powder or a plasticizer dispersion liquid containing the ATO infrared absorbing fine particles and a plasticizer dispersion liquid. As a method for removing the solvent component from the ATO infrared absorbing fine particle dispersion liquid, it is preferable to dry the ATO infrared absorbing fine particle dispersion liquid under a reduced pressure. Specifically, the ATO infrared absorbing fine particle dispersion liquid is dried under a reduced pressure while stirring, and the ATO infrared absorbing fine particle-containing composition and the solvent component are separated. As a device used for the reduced pressure drying, a vacuum stirring type dryer can be used, but it is not particularly limited as long as it is an apparatus having the above function. Further, the pressure value at the time of reduced pressure in the drying step is appropriately selected.

By using the reduced pressure drying method, the efficiency of removing the solvent from the ATO infrared absorbing fine particle dispersion liquid is improved, and the dispersed powder and the plasticizer dispersion liquid are not exposed to a high temperature for a long time. Therefore, aggregation of the ATO infrared absorbing fine particles dispersed in the dispersed powder or the plasticizer dispersion liquid does not occur, which is preferable. Further, the productivity of the dispersed powder and the plasticizer dispersion liquid is increased, and the evaporated solvent can be easily recovered, which is preferable from a viewpoint of environmental consideration.

In the dispersed powder and the plasticizer dispersion liquid obtained after the drying step, a residual solvent is preferably 5 mass % or less. This is because when the residual solvent is 5 mass % or less, bubbles are not generated when processing the dispersed powder or the plasticizer dispersion liquid, for example, into a laminated transparent base material, and good appearance and optical properties are maintained.

Further, a master batch can be obtained by dispersing the ATO infrared absorbing fine particles or the dispersed powder in a resin and pelletizing the resin.

Further, the master batch can also be obtained by processing into a pellet form using a method for uniformly mixing the ATO infrared absorbing fine particles and the dispersed powder, granules or pellets of thermoplastic resin and, if necessary, other additives, and thereafter kneading the mixture with a vent type single-screw or twin-screw extruder, and cutting a common melt-extruded strand. In this case, as the shape thereof, a cylindrical or prismatic shape can be cited. Further, it is also possible to adopt a so-called hot cut method in which the melt extrudate is directly cut. In this case, it is common to take a spherical shape.

5. Sheet-Like or Film-Like ATO Infrared Absorbing Fine Particle Dispersion Body

By uniformly mixing the dispersed powder, the plasticizer dispersion liquid, or the master batch into the transparent resin, sheet-like or film-like ATO infrared absorbing fine particle dispersion body of the present invention can be produced.

When the sheet-like or the film-like ATO infrared absorbing fine particle dispersion body is produced, various thermoplastic resins can be used for the resin constituting the sheet or the film. Then, when taking it consideration that the sheet-like or the film-like ATO infrared absorbing fine particle dispersion body is applied to an optical filter, the thermoplastic resin having sufficient transparency is preferable.

Specifically, it is possible to select a preferable resin from the resin selected from a group of resins such as polyethylene terephthalate resin, polycarbonate resin, acrylic resin, styrene resin, polyamide resin, polyethylene resin, vinyl chloride resin, olefin resin, epoxy resin, polyimide resin, fluororesin, and ethylene • vinyl acetate copolymer, or the mixture of two or more resins selected from the above resin group, or the copolymer of two or more resins selected from the above resin group.

Further, when the sheet-like or the film-like ATO infrared absorbing fine particle dispersion body is used as an intermediate layer, and when the thermoplastic resin constituting the sheet or the film does not have sufficient flexibility or adhesion on the transparent base material if it is used as a simple body, for example, when the thermoplastic resin is a polyvinyl acetal resin, it is preferable to further add the plasticizer.

As the plasticizer, it is possible to use a substance used as a plasticizer for the thermoplastic resin of the present invention. For example, as the plasticizer used for the infrared absorbing film made of polyvinyl acetal resin, a plasticizer that is a compound of a monohydric alcohol and an organic acid ester, a plasticizer that is an ester type such as a polyhydric alcohol organic acid ester compound, and a plasticizer that is a phosphoric acid type such as an organic phosphate type plasticizer, can be used. Any one of these plasticizers is preferably a liquid state at room temperature. Among them, a plasticizer which is an ester compound synthesized from a polyhydric alcohol and a fatty acid is preferable.

The dispersed powder or the plasticizer dispersion liquid or the masterbatch, the thermoplastic resin and optionally the plasticizer and other additives are kneaded, and thereafter by a known method such as an extrusion molding method and an injection molding method, etc., for example, a sheet-like ATO infrared absorbing fine particle dispersion body formed into a flat or curved surface shape can be produced.

Known methods can be used for forming the sheet-like or the film-like ATO infrared absorbing fine particle dispersion body. For example, a calendar roll method, an extrusion method, a casting method, an inflation method, or the like can be used.

6. Infrared Absorbing Laminated Transparent Base Material

Explanation will be given for the infrared absorbing laminated transparent base material formed by sandwiching the sheet-like or the film-like ATO infrared absorbing fine particle dispersion body as an intermediate layer between a plurality of transparent base materials made of a plate glass or a plastic material.

The infrared absorbing laminated transparent base material is obtained by sandwiching the intermediate layer from both sides thereof using a transparent base material. As the transparent base material, a plate glass transparent in the visible light region, a plate-like plastic, or a film-like plastic is used. The material of the plastic is not particularly limited, and it can be selected according to the application, and polycarbonate resin, acrylic resin, polyethylene terephthalate resin, PET resin, polyamide resin, vinyl chloride resin, olefin resin, epoxy resin, polyimide resin, fluororesin, and the like can be used.

The infrared absorbing laminated transparent base material of the present invention, can also be obtained by laminating a plurality of facing transparent base materials sandwiching the sheet-like or film-like infrared absorbing fine particle dispersion body of the present invention and integrating them by a known method.

7. Infrared Absorbing Film and Infrared Absorbing Glass

By forming the coating layer containing the infrared ray absorbing fine particles on the transparent base material selected from the substrate film or the substrate glass by using the abovementioned infrared absorbing fine particle dispersion liquid, an infrared absorbing film or an infrared absorbing glass can be produced.

By mixing the aforementioned infrared absorbing fine particle dispersion liquid and plastic or monomer to prepare a coating liquid and forming a coating layer on the transparent base material by a known method, an infrared absorbing film or an infrared absorbing glass can be produced.

For example, the infrared absorbing film can be prepared as follows.

A medium resin is added into the abovementioned infrared absorbing fine particle dispersion liquid to thereby obtain a coating liquid. After the surface of the base material is coated with the coating liquid, the solvent is evaporated and the resin is cured by a predetermined method, it becomes possible to form a coating layer in which the infrared absorbing fine particles are dispersed in the medium.

As the medium resin of the coating layer, for example, a UV curable resin, a thermosetting resin, an electron beam curable resin, a room temperature curable resin, and a thermoplastic resin, etc. can be selected according to the purpose. Specifically, polyethylene resin, polyvinyl chloride resin, polyvinylidene chloride resin, polyvinyl alcohol resin, polystyrene resin, polypropylene resin, ethylene vinyl acetate copolymer, polyester resin, polyethylene terephthalate resin, fluorine resin, polycarbonate resin, acrylic resin, and polyvinyl butyral resin, can be used.

These resins may be used alone or in combination. However, among the media for the coating layer, it is particularly preferable to use a UV curable resin binder from a viewpoint of productivity and equipment cost.

Further, it is also possible to use a binder in which a metal alkoxide is used. As the metal alkoxide, alkoxides such as Si, Ti, Al, Zr and the like are representative. By hydrolysis/polycondensation of a binder by heating, etc., in which these metal alkoxides are used, it is possible to form a coating layer composed of an oxide layer.

In addition to the abovementioned method, the coating layer may be formed by further coating the surface of the substrate film or the substrate glass with the binder in which the medium resin or the metal alkoxide is used, after coating it with the infrared absorbing fine particle dispersion liquid.

The abovementioned film base material is not limited to the shape of a film, and it may be, for example, a board shape or a sheet shape. As the base material of the film, PET, acrylic, urethane, polycarbonate, polyethylene, ethylene vinyl acetate copolymer, vinyl chloride, fluorine resin and the like can be used according to various purposes. However, the infrared absorbing film is preferably a polyester film, and more preferably a PET film.

Further, the surface of the film substrate is preferably subjected to a surface treatment in order to realize easy adhesion of the coating layer. Further, in order to improve the adhesion between the glass substrate or the film substrate and the coating layer, it is also preferable to form the intermediate layer on the glass substrate or the film substrate and form the coating layer on the intermediate layer. The structure of the intermediate layer is not particularly limited, and it may be composed of, for example, a polymer film, a metal layer, an inorganic layer (for example, an inorganic oxide layer of silica, titania, zirconia or the like), an organic/inorganic composite layer, etc.

The method for providing the coating layer on the substrate film or the substrate glass is not particularly limited, and any method may be used as long as it can uniformly coat the surface of the base material with the infrared absorbing fine particle dispersion liquid. For example, a bar coating method, a gravure coating method, a spray coating method, a dip coating method, and the like can be used.

For example, according to the bar coating method using the UV curable resin, a coating layer can be formed on the substrate film or substrate glass by coating it with a coating liquid prepared by appropriately adjusting a liquid concentration and additives so as to have appropriate leveling properties, using a wire bar of a bar number which can satisfy the purpose of the thickness of the coating layer and the content of the infrared absorbing fine particles. Then, by removing the solvent contained in the coating solution by drying and then curing by irradiation with ultraviolet rays, the coating layer can be formed on the substrate film or the substrate glass. At this time, the drying condition for the coating layer is usually about 60° C. to 140° C. for about 20 seconds to 10 minutes, although it varies depending on each component, kind of solvent and a usage ratio. Ultraviolet irradiation is not particularly limited, and a UV exposure machine such as an extra-high pressure mercury lamp can be suitably used, for example.

In addition, in a pre-step or a post-step of forming the coating layer, the adhesion between the substrate and the coating layer, smoothness of the coating layer at the time of coating, drying property of the organic solvent and the like can be adjusted. As the pre-step, there are, for example, a substrate surface treatment step, a prebake (preheating of the substrate) step, etc., and as the post-step, there is a post baking (post-heating of the substrate) step, etc, and they can be selected appropriately. The heating temperature in the pre-baking step and/or post-baking step is preferably 80° C. to 200° C., and the heating time is preferably 30 seconds to 240 seconds.

The thickness of the coating layer on the substrate film or on the substrate glass is not particularly limited, and for practical use, it is preferably 10 μm or less, and more preferably 6 μm or less. This is because when the thickness of the coating layer is 10 μm or less, sufficient pencil hardness is exhibited and scratch resistance is exhibited, and in addition, occurrence of abnormality in the step such as occurrence of warping of the substrate film can be avoided during volatilization of the solvent in the coating layer and curing of the binder

EXAMPLES

Hereinafter, the present invention will be specifically described with reference to examples.

Example 1

54.9 g of $SnCl_4 \cdot 5H_2O$ (Wako Pure Chemical Industries, Wako Pure Grade purity 98% or more) was dissolved in 340 g of water at 25° C. to thereby prepare a solution. Into this solution, parallel dropping was performed, using 12.7 ml of a methanol solution (Yoshiyama Pharmaceutical Industry's special grade reagent purity of 99.8% or more) in which 4.2 g of $SbCl_3$ (JIS special grade purity 98% or more manufactured by Wako Pure Chemical Industries, Ltd.) was dissolved, and $NH_4OH$ aqueous solution diluted to a concentration of 16% (reagent special grade concentration manufactured by Wako Pure Chemical Industries, concentration 30%). Then, by this parallel dropping, a hydroxide containing tin and antimony which were precursors of ATO infrared absorbing fine particles, was produced and precipitated.

An addition amount of the antimony compound into the abovementioned tin compound solution was 9.5 parts by weight in terms of element of antimony based on 100 parts by weight of tin (IV) oxide, from a viewpoint of desired optical properties. With this addition amount, it is possible to prepare ATO infrared absorbing fine particles in which Sn element is about 68 mass % and Sb element is about 8 mass %.

Aqueous ammonia was used as an alkali solution used as the precipitant, and the alkali concentration was set to 16% which was 1.6 times equivalent of a chemical equivalent required for the tin compound and the antimony compound to be hydroxide.

The parallel dropping time of the methanol solution and the alkaline solution was set to 25 minutes, and the parallel dropping was performed until pH of the solution reached 7.5. Stirring of the solution was continued for 10 minutes in order to homogenize the inside of the system even after completion of the dropwise addition. The temperature of the solution at that time was the same as the temperature at the time of parallel dropping and was set to 65° C.

Next, decantation was repeated on the precipitate. The decanted precipitate was thoroughly washed and filtered until the conductivity of the supernatant of the washing solution in the decantation became 1 mS/cm or less.

Next, the washed precipitate was wet-treated with an anhydrous ethyl alcohol solution (reagent grade purity of 99.5% or more and manufactured by Wako Pure Chemical Industries, Ltd.). At the time of the wet-treatment, a weight ratio of [filtered precipitate:anhydrous ethyl alcohol solution] was set to 1:4 ratio (alcohol proportion was equivalent to 80%), and the filtered precipitate and the anhydrous ethyl alcohol solution were wet-treated by stirring at room temperature for 1 hour to thereby obtain a precursor. After completion of the wet-treatment, the precursor was dried at 90° C. for 10 hours to thereby obtain a dried product.

Then, the ATO infrared absorbing fine particle precursor subjected to the wet-treatment was heated to 700° C. in an air atmosphere and fired for 2 hours, to thereby produce the ATO infrared absorbing fine particles of example 1.

The crystal structure of the obtained ATO infrared absorbing fine particles of example 1 was measured by a θ-2θ method using a powder XRD apparatus (D2 Phaser manufactured by BRUKER), and crystal lattice constants a and c and a crystallite size were calculated by analysis using a WPPF (Whole Powder Pattern Fitting) method. Further, in order to examine a composition of the ATO infrared absorbing fine particles, quantitative analysis of Sn element and Sb element was performed by ICP emission spectrometry (ICPE-9000 manufactured by Shimadzu Corporation).

Then, a volume resistivity of a green compact of the ATO infrared absorbing fine particles was measured. 2 to 3 g of the ATO infrared absorbing fine particles were packed in a cylinder to obtain a columnar sample having a diameter of 20.0 mm and a thickness of 2.5 mm to 4.0 mm, and the sample was compressed from an axial direction under a load of 11.8 to 12.2 kN and a pressure of 37.5 to 39.0 Mpa, to thereby obtain a green compact, and while being compressed, and using a low resistance powder measurement system (MCP-PD 51 manufactured by Mitsubishi Chemical Analytech), the value of the volume resistivity of the green compact of the ATO infrared absorbing fine particles was measured by a DC four-terminal method. At this time, a density of the green compact was 2.8 g/cc.

Crystal lattice constant a was 4.740 Å, crystal lattice constant c was 3.190 Å, and a crystallite size was 7.8 nm, regarding the ATO infrared absorbing fine particles of example 1. Further, when the composition of the ATO infrared absorbing fine particles was examined by ICP emission spectrometry, Sn concentration was 68.1 mass % and Sb concentration was 8.2 mass %. Further, the value of the volume resistivity of the ATO infrared absorbing fine particles was 0.152 Ω·cm. The evaluation results are shown in table 1.

25 parts by weight of the obtained ATO infrared absorbing fine particles according to example 1, 67.5 parts by weight of toluene (special grade purity of 99.5% or more manufactured by Daikyo Kagaku Co., Ltd.), and 7.5 parts by weight of a polymer dispersant having a carboxyl group as a functional group, were mixed, to thereby prepare 30 kg of slurry. This slurry was charged into a medium stirring mill together with beads, the slurry was circulated, and pulverization and dispersion treatment was performed for 5 hours.

The media stirring mill of a horizontal cylindrical annular type (manufactured by Ashizawa Co., Ltd.) was used, and the material of a vessel inner wall and a rotor (rotary stirring part) was selected as $ZrO_2$. For the beads, beads made of YSZ (Yttria-Stabilized Zirconia) having a diameter of 0.1 mm were used.

A rotational speed of the rotor was set to 13 rpm/sec, and a slurry flow rate was set to 5 kg/min to perform a pulverization and dispersion treatment to thereby obtain a dispersion liquid of example 1.

A dispersed particle size of the ATO infrared absorbing fine particles in the obtained dispersion liquid of example 1 was measured using a particle size measuring apparatus (ELS-8000 manufactured by Otsuka Electronics Co., Ltd.) based on a principle of dynamic light scattering method. In this measurement, the dispersion liquid of example 1 was diluted with toluene and placed in a 1 cm square glass cell, which was used as a measurement sample. After dilution, the glass cell was set in the apparatus, and it was confirmed that a light amount was 5000 to 16000 cps at the time of light intensity measurement, to thereby perform measurement of the dispersed particle size. In this measurement, a particle refractive index was set to 2.00, a particle shape was set to be spherical, and a solvent refractive index was set to 1.50.

As a result of this measurement, the dispersed particle size of the ATO infrared absorbing fine particles in the dispersion liquid of example 1 was 105 nm.

The obtained dispersion liquid of example 1 was diluted with toluene as a solvent. At this time, in the measurement of a transmittance described later, the dispersion liquid was diluted so that the visible light transmittance of the dispersion liquid became 60%, 70%, and 80%. A dilution ratio by toluene at this time is shown in table 2.

After adjustment of the concentration by dilution with toluene, the dispersion liquid was placed in a glass cell having a bottom surface of 1 cm square and a height of 5 cm, and the light transmittance of the dispersion liquid in the glass cell was measured at intervals of 5 nm in a wavelength range of 300 nm to 2600 nm by a spectrophotometer (U-4100, manufactured by Hitachi, Ltd.). In this measurement, an incident direction of light of the spectrophotometer was set to be perpendicular to a side surface of the glass cell. However, a blank solution containing only toluene as a solvent in the glass cell was used as a baseline of the light transmittance.

Regarding the dispersion liquid of example 1 diluted to have a visible light transmittance of 70%, the solar radiation transmittance was determined from a result of a transmittance measurement, that is, a transmission profile, and it was found to be 48.1%.

The content of the ATO infrared ray absorbing fine particles of example 1 per unit projected area in the glass cell was 8.7 $g/m^2$ when the visible light transmittance was normalized to 60%. It was 6.0 $g/m^2$ when the visible light transmittance was normalized to 70%. Further, it was 3.7 $g/m^2$, when the visible light transmittance was normalized to 80%. The content of the ATO infrared absorbing fine particles is a weight of the ATO infrared absorbing fine particles contained in a thickness direction per unit area through which light passes. An evaluation results are shown in table 2 and FIG. 1.

Example 2

ATO infrared absorbing fine particles of example 2 were produced by performing the same operation as in example 1 except that the ATO infrared absorbing fine particle precursor subjected to the wet-treatment was heated in an air atmosphere and fired for 5 hours. Production conditions and evaluation results are shown in table 1.

By using the ATO infrared absorbing fine particles of example 2 and performing the same operation as in example 1, a dispersion liquid of example 2 was obtained.

The same evaluation as in example 1 was performed for the dispersion liquid of example 2. The evaluation results are shown in table 2 and FIG. 1.

Example 3

ATO infrared absorbing fine particles of example 3 were produced by performing the same operation as in example 1 except that the addition amount of the antimony compound into the tin compound solution was set to 10.5 parts by weight in terms of the element of antimony based on 100 parts by weight of tin (IV) oxide. At this time, the use amount of $SnCl_4 \cdot 5H_2O$ was 49.7 g and the use amount of $SbCl_3$ was 4.2 g. The production conditions and evaluation results are shown in table 1.

A dispersion liquid of example 3 was obtained by performing the same operation as in example 1, using the ATO infrared absorbing fine particles of example 3.

The same evaluation as in example 1 was performed to the dispersion liquid of example 3. The evaluation results are shown in table 2 and FIG. 1.

Example 4

ATO infrared absorbing fine particles of example 4 were produced by performing the same operation as in example 1 except that the ATO infrared absorbing fine particle precursor subjected to the wet-treatment was heated and fired at 800° C. in the air atmosphere. The production conditions and evaluation results are shown in table 1.

A dispersion liquid of example 4 was obtained by using the ATO infrared absorbing fine particles of example 4 and performing the same operation as in example 1.

The same evaluation as in example 1 was performed to the dispersion liquid of example 4. The evaluation results are shown in table 2 and FIG. 1.

Example 5

The dispersion liquid of example 1 before dilution with toluene was added to the polycarbonate resin so that the concentration of the ATO infrared absorbing fine particles was 0.22 wt %, and thereafter the mixture was uniformly melted and mixed by a blender and a twin screw extruder. Then, the molten mixture was extruded and molded into a thickness of 2 mm using a T die, to thereby obtain an infrared absorbing fine particle dispersion body of example 5 in which the ATO infrared absorbing fine particles were uniformly dispersed throughout resin.

The haze of the obtained infrared absorbing fine particle dispersion body of example 5 was measured according to JIS K 7105 using a haze meter (HM-150, manufactured by Murakami Color Research Laboratory) and found to be 0.5%. Further, when the transmittance of the obtained infrared absorbing fine particle dispersion body of example 5 was measured with a spectrophotometer at intervals of 5 nm in a wavelength range of 200 nm to 2600 nm, and the visible light transmittance and the solar radiation transmittance were determined, the visible light transmittance was 70.4% and the solar radiation transmittance was 50.7%. Further, when the content of the ATO infrared absorbing fine particles per unit projected area of the obtained infrared absorbing fine particle dispersion body was estimated from a mixing ratio of the ATO infrared absorbing fine particles and polycarbonate resin, it was found to be 5.3 g/m$^2$. The evaluation results are shown in table 3.

Example 6

The dispersion liquid of example 1 before dilution with toluene was added to polyvinyl butyral and triethylene glycol di-2-ethyl butyrate was added thereto as a plasticizer. At this time, the concentration of the ATO infrared absorbing fine particles was adjusted so that the visible light transmittance of the laminated transparent base material to be produced was 70%, and an intermediate layer composition was prepared so that the concentration of the ATO infrared absorbing fine particles was 0.64 mass % and the concentration of polyvinyl butyral was 71 mass %. The prepared composition was kneaded with a roll and formed into a 0.76 mm thick sheet to thereby prepare an intermediate layer for a laminated transparent base material of example 6. The prepared intermediate layer for a laminated transparent base material was sandwiched between two 100 mm×100 mm×about 2 mm thick clear glass substrates, and temporary adhesion was performed by heating at 80° C., and thereafter main adhesion was performed by loading it on an autoclave at a temperature of 140° C. and under a pressure of 14 kg/cm$^2$, to thereby prepare a laminated transparent base material of example 6.

When the optical properties of the obtained transparent laminated base material of example 6 were measured in the same manner as in example 5, the haze was 0.4%, the visible light transmittance was 70.2%, and the solar radiation transmittance was 50.6%. Further, when the content of the ATO infrared absorbing fine particles per unit projected area of the obtained infrared absorbing fine particle dispersion body was estimated from the mixing ratio of the ATO infrared absorbing fine particles and polyvinyl butyral resin or tri- ethylene glycol di-2-ethyl butyrate, it was found to be 5.4 g/m$^2$. The evaluation results are shown in table 3.

Example 7

75.0 wt % of the dispersion liquid of example 1 before dilution with toluene and 25.0 wt % of UV curable resin were well mixed to thereby prepare a dispersion liquid for forming an infrared absorbing film.

Here, a PET (polyethylene terephthalate) film having a thickness of 50 µm was coated with the prepared dispersion liquid for forming the infrared absorbing film using a bar coater (IMC-700 manufactured by Imoto Seisakusho) to thereby form a coating layer. The solvent was evaporated from the coating layer by heating at 70° C. for 1 minute and then irradiated with ultraviolet rays from a high pressure mercury lamp to thereby obtain an infrared absorbing film of example 7.

When the optical properties of the obtained infrared absorbing film of example 7 were measured in the same manner as in example 5, the haze was 0.7%, the visible light transmittance was 69.7%, and the solar radiation transmittance was 49.3%. Further, when the layer thickness of the coating layer containing ATO infrared absorbing fine particles was measured using a high precision micrometer (MDH-25M manufactured by Mitutoyo), it was found to be 5.0 µm. At this time, when the content of the ATO infrared absorbing fine particles per unit projected area of the obtained infrared absorbing film was estimated from the mixing ratio of the ATO infrared absorbing fine particles and the UV-curable resin, it was found to be 5.5 g/m$^2$. The evaluation results are shown in table 3.

Example 8

The same operation as in example 7 was performed except for using a 3 mm thick clear glass instead of a PET (polyethylene terephthalate) film with a thickness of 50 µm, to thereby obtain an infrared absorbing glass of example 8.

When the optical properties of the obtained infrared absorbing glass of example 8 were measured in the same manner as in example 5, the haze was 0.1%, the visible light transmittance was 70.0%, and the solar radiation transmittance was 48.8%. Further, when a layer thickness of the coating layer containing the ATO infrared absorbing fine particles was measured using a high precision micrometer (MDH-25M manufactured by Mitutoyo), it was found to be 5.4 µm. At this time, when the content of the ATO infrared absorbing fine particles per unit projected area of the obtained infrared absorbing film was estimated from the mixing ratio of the ATO infrared absorbing fine particles and the UV-curable resin, it was found to be 5.9 g/m$^2$. The evaluation results are shown in table 3.

Comparative Example 1

ATO infrared absorbing fine particles of comparative example 1 were produced in the same manner as in example 1 except that the addition amount of the antimony compound into the tin compound solution was set to 8.5 parts by weight in terms of antimony element based on 100 parts by weight of tin (IV) oxide, and further, the ATO infrared absorbing fine particle precursor subjected to the wet-treatment was heated to 900° C. in the air atmosphere and fired for 1 hour. At this time, the use amount of SnCl$_4$.5H$_2$O was 61.3 g and the use amount of SbCl$_3$ was 4.2 g. The production conditions and evaluation results are shown in table 1.

By using the ATO infrared absorbing fine particles of comparative example 1 and performing the same operation as in example 1, a dispersion liquid of comparative example 1 was obtained.

The same evaluation as in example 1 was performed to the dispersion liquid of comparative example 1. The evaluation results are shown in table 2 and FIG. 1.

Comparative Example 2

ATO infrared absorbing fine particles of comparative example 2 were produced in the same manner as in example 1, except that the addition amount of the antimony compound into the tin compound solution was set to 8.5 parts by weight in terms of antimony element based on 100 parts by weight of tin (IV) oxide, and further the ATO infrared absorbing fine particle precursor subjected to the wet-treatment was heated to 600° C. in the air atmosphere. At this time, the use amount of $SnCl_4 \cdot 5H_2O$ was 61.3 g and the use amount of $SbCl_3$ was 4.2 g. The production conditions and evaluation results are shown in table 1.

By using the ATO infrared absorbing fine particles of comparative example 2 and performing the same operation as in example 1, a dispersion liquid of comparative example 2 was obtained.

The same evaluation as in example 1 was performed to the dispersion liquid of comparative example 2. The evaluation results are shown in table 2 and FIG. 1.

Comparative Example 3

ATO infrared absorbing fine particles of comparative example 3 were produced in the same manner as in example 1, except that the addition amount of the antimony compound into the tin compound solution was set to 13.7 parts by weight in terms of antimony element based on 100 parts by weight of tin (IV) oxide. At this time, the use amount of $SnCl_4 \cdot 5H_2O$ was 38.1 g and the use amount of $SbCl_3$ was 4.2 g. The production conditions and evaluation results are shown in table 1.

By using the ATO infrared absorbing fine particles of comparative example 3 and performing the same operation as in example 1, a dispersion liquid of comparative example 3 was obtained.

The same evaluation as in example 1 was performed to the dispersion liquid of comparative example 3. The evaluation results are shown in table 2 and FIG. 1.

Comparative Example 4

ATO infrared absorbing fine particles of comparative example 4 were produced in the same manner as in example 1, except that the addition amount of the antimony compound into the tin compound solution was set to 4.4 parts by weight in terms of antimony element based on 100 parts by weight of tin (IV) oxide. At this time, the use amount of $SnCl_4 \cdot 5H_2O$ was 59.3 g and the use amount of $SbCl_3$ was 2.1 g. The production conditions and evaluation results are shown in table 1.

By using the ATO infrared absorbing fine particles of comparative example 4 and performing the same operation as in example 1, a dispersion liquid of comparative example 4 was obtained.

The same evaluation as in example 1 was performed to the dispersion liquid of comparative example 4. The evaluation results are shown in table 2 and FIG. 1.

Comparative Example 5

ATO infrared absorbing fine particles of comparative example 5 were produced in the same manner as in example 1, except that the ATO infrared absorbing fine particle precursor subjected to the wet-treatment was heated to 1100° C. in the air atmosphere. The production conditions and evaluation results are shown in table 1.

By using the ATO infrared absorbing fine particles of comparative example 5 and performing the same operation as in example 1, a dispersion liquid of comparative example 5 was obtained.

The same evaluation as in example 1 was performed to the dispersion liquid of comparative example 5. The evaluation results are shown in table 2 and FIG. 1.

Comparative Example 6

An infrared absorbing fine particle dispersion body of comparative example 6 was obtained by performing the same operation as in example 5, except that the dispersion liquid before diluted with toluene mixed with the polycarbonate resin was replaced with the dispersion liquid of comparative example 1 from the dispersion liquid of example 1.

The same evaluation as in example 5 was performed to the dispersion liquid of comparative example 6. The evaluation results are shown in table 3.

Comparative Example 7

An intermediate layer for a laminated transparent base material and a laminated transparent base material of comparative example 7 were obtained by performing the same operation as in example 6, except that the dispersion liquid before diluted with toluene mixed with polyvinyl butyral resin and triethylene glycol-di-2-ethyl butyrate was replaced with the dispersion liquid of comparative example 1 from the dispersion liquid of example 1.

The same evaluation as in example 6 was performed to the intermediate layer for the laminated transparent base material and laminated transparent base material of comparative example 7. The evaluation results are shown in table 3.

Comparative Example 8

An infrared absorbing film of comparative example 8 was obtained by performing the same operation as in example 7, except that the dispersion liquid before diluted with toluene mixed with the UV curable resin was replaced with the dispersion liquid of comparative example 1 from the dispersion liquid of example 1.

The same evaluation as in example 7 was performed to the infrared absorbing film of comparative example 8. The evaluation results are shown in table 3.

Comparative Example 9

An infrared absorbing glass of comparative example 9 was obtained by performing the same operation as in example 8, except that the dispersion liquid before diluted with toluene mixed with the UV curable resin was replaced with the dispersion liquid of comparative example 1 from the dispersion liquid of example 1.

The same evaluation as in example 8 was performed to the infrared absorbing glass of comparative example 9. The evaluation results are shown in table 3.

TABLE 1

|  | Sb Addition amount (Parts by weight) | Firing condition Time (Time) | Firing condition Temperature (° C.) | Lattice constant a (Å) | Lattice constant c (Å) | Crystallite size (nm) | Concentration Sn (mass %) | Concentration Sb (mass %) | Green compact Volume resistivity (Ω·cm) | Green compact Density (g/cc) | Dispersed particle size (nm) | *Solar radiation transmittance (%) |
|---|---|---|---|---|---|---|---|---|---|---|---|---|
| Example 1 | 9.5 | 2 | 700 | 4.740 | 3.190 | 7.8 | 68.1 | 8.2 | 0.152 | 2.8 | 105 | 48.1 |
| Example 2 | 9.5 | 5 | 700 | 4.739 | 3.189 | 8.0 | 68.9 | 8.1 | 0.229 | 3.2 | 107 | 47.8 |
| Example 3 | 10.5 | 2 | 700 | 4.738 | 3.189 | 6.3 | 67.8 | 8.9 | 0.259 | 3.2 | 104 | 48.5 |
| Example 4 | 9.5 | 2 | 800 | 4.742 | 3.191 | 8.9 | 69.0 | 8.1 | 0.233 | 2.4 | 106 | 47.8 |
| Comparative example 1 | 8.5 | 1 | 900 | 4.739 | 3.188 | 10.5 | 69.8 | 7.6 | 1.128 | 3.0 | 105 | 47.2 |
| Comparative example 2 | 8.5 | 2 | 600 | 4.728 | 3.185 | 4.4 | 71.1 | 7.4 | 0.512 | 3.0 | 107 | 51.4 |
| Comparative example 3 | 13.7 | 2 | 700 | 4.731 | 3.185 | 5.1 | 65.5 | 11.5 | 0.487 | 2.9 | 105 | 48.8 |
| Comparative example 4 | 4.4 | 2 | 700 | 4.741 | 3.190 | 11.5 | 72.7 | 4.0 | 1.613 | 2.2 | 105 | 48.3 |
| Comparative example 5 | 9.5 | 2 | 1100 | 4.739 | 3.189 | 13.4 | 68.8 | 8.1 | 1.651 | 2.5 | 104 | 48.2 |

*Solar radiation transmittance: Solar radiation transmittance is obtained by normalizing visible transmittance to 70%

TABLE 2

|  | Visible light transmittance is normalized to 60% | | Visible light transmittance is normalized to 70% | | Visible light transmittance is normalized to 80% | |
|---|---|---|---|---|---|---|
|  | Dilution ratio (Ratio) | *ATO use amount (g/m²) | Dilution ratio (Ratio) | *ATO use amount (g/m²) | Dilution ratio (Ratio) | *ATO use amount (g/m²) |
| Example 1 | 250 | 8.7 | 360 | 6.0 | 580 | 3.7 |
| Example 2 | 220 | 9.9 | 320 | 6.8 | 510 | 4.3 |
| Example 3 | 220 | 9.9 | 310 | 7.0 | 500 | 4.3 |
| Example 4 | 220 | 9.9 | 310 | 7.0 | 500 | 4.3 |
| Comparative example 1 | 170 | 12.8 | 240 | 9.0 | 380 | 5.7 |
| Comparative example 1 | 160 | 13.5 | 240 | 9.0 | 380 | 5.7 |
| Comparative example 1 | 150 | 14.5 | 220 | 9.9 | 350 | 6.2 |
| Comparative example 1 | 140 | 15.5 | 200 | 10.8 | 320 | 6.8 |
| Comparative example 1 | 130 | 16.7 | 180 | 12.0 | 290 | 7.5 |

*ATO use amount: ATO use amount per unit projected area

TABLE 3

|  | Product | Product (%) | Visible light transmittance (%) | Solar radiation transmittance (%) | *ATO use amount (g/m²) |
|---|---|---|---|---|---|
| Example 5 | Infrared absorbing fine particle dispersion body | 0.5 | 70.4 | 50.7 | 5.3 |
| Example 6 | Laminated transparent base material | 0.4 | 70.2 | 50.6 | 5.4 |
| Example 7 | Infrared absorbing film | 0.7 | 69.7 | 49.3 | 5.5 |
| Example 8 | Infrared absorbing glass | 0.1 | 70.0 | 48.8 | 5.9 |
| Comparative example 6 | Infrared absorbing fine particle dispersion body | 0.5 | 70.3 | 50.3 | 8.0 |
| Comparative example 7 | Laminated transparent base material | 0.4 | 70.0 | 50.3 | 8.1 |
| Comparative example 8 | Infrared absorbing film | 0.7 | 70.2 | 49.5 | 8.3 |
| Comparative example 9 | Infrared absorbing glass | 0.1 | 70.1 | 48.9 | 8.9 |

*ATO use amount: ATO use amount per unit projected area

CONCLUSION

As is apparent from the results of tables 1 to 3, when the ATO infrared fine particles of examples 1 to 4 were used, the use amount of the ATO could be reduced by 20% or more when normalized to the same visible light transmittance, compared with the ATO infrared fine particles of conventional comparative examples 1 to 5.

Namely, it was found that the ATO infrared fine particles of the present invention have excellent solar radiation shielding properties, and further have high coloring power.

Accordingly, it exhibits a certain desired solar radiation shielding property, so that it is possible to extremely reduce the amount of the required ATO infrared absorbing fine particles, which can be said to be industrially preferable.

The invention claimed is:

1. Infrared absorbing fine particles, which are antimony-containing tin oxide (ATO) fine particles having a crystal lattice constant a being 4.736 Å or more and 4.743 Å or less, a crystal lattice constant c being 3.187 Å or more and 3.192 Å or less, and a crystallite size being 5.5 nm or more and 10.0 nm or less, wherein
   in the ATO fine particles, Sn element is contained in a concentration of 66.0 mass % or more and 70.0 mass % or less and Sb element is contained in a concentration of 8.0 mass % or more and 9.0 mass % or less, and
   a value obtained by a volume resistivity measurement performed to a green compact of the ATO fine particles is 0.05 Ω·cm or more and 0.35 Ω·cm or less.

2. The infrared absorbing fine particles according to claim 1, wherein the crystallite size is 6.0 nm or more and 9.0 nm or less.

3. An infrared absorbing fine particle dispersion liquid which is a dispersion liquid in which the infrared absorbing fine particles of claim 1 are dispersed in a liquid medium, and the liquid medium is selected from water, an organic solvent, an oil and fat, a liquid resin, a plasticizer in a liquid state, or a mixture thereof.

4. The infrared absorbing fine particle dispersion liquid according to claim 3, wherein a dispersed particle size of the infrared absorbing fine particles contained in the infrared absorbing fine particle dispersion liquid is 1 nm or more and 110 nm or less.

5. The infrared absorbing fine particle dispersion liquid according to claim 3, wherein a content of the infrared absorbing fine particles contained in the infrared absorbing fine particle dispersion liquid is 1 mass % or more and 50 mass % or less.

6. The infrared absorbing fine particle dispersion liquid according to claim 3, wherein when the infrared absorbing fine particle dispersion liquid is diluted with the liquid medium or concentrated by removing the liquid medium so that a visible light transmittance is 70%, a solar radiation transmittance is 40% or more and 50% or less and infrared absorbing fine particles of 5.0 g/m² or more and 7.0 g/m² or less per unit projected area are contained.

7. An infrared absorbing fine particle dispersion body, containing the infrared absorbing fine particles of claim 1 and a thermoplastic resin.

8. The infrared absorbing fine particle dispersion body according to claim 7, wherein the thermoplastic resin is any one of one resin selected from the group consisting of polyethylene terephthalate resin, polycarbonate resin, acrylic resin, styrene resin, polyamide resin, polyethylene resin, vinyl chloride resin, olefin resin, epoxy resin, polyimide resin, fluororesin, ethylene vinyl acetate copolymer, and polyvinyl acetal resin, or a mixture of two or more resins selected from the above resin group, or copolymers of two or more resins selected from the above resin group.

9. The infrared absorbing fine particle dispersion body according to claim 7, wherein the infrared absorbing fine particles are contained in an amount of 0.01 mass % or more and 25 mass % or less.

10. The infrared absorbing fine particle dispersion body according to claim 7, wherein the infrared absorbing fine particle dispersion body has a sheet shape, a board shape or a film shape.

11. The infrared absorbing fine particle dispersion body according to claim 7, wherein infrared absorbing fine particles are contained in an amount of 5.0 g/m² or more and 7.0 g/m² or less per unit projected area, the infrared absorbing fine particles being formed as a dispersion body having a solar radiation transmittance of 42% or more and 52% or less when its visible light transmittance is 70%.

12. An infrared absorbing laminated transparent base material, wherein the infrared absorbing fine particle dispersion body of claim 7 is present between a plurality of transparent base materials.

13. An infrared absorbing film or an infrared absorbing glass, having a coating layer on at least one side of a transparent base material selected from a transparent film base material or a transparent glass base material, wherein the coating layer is a binder resin containing the infrared absorbing fine particles of claim 1.

14. The infrared absorbing film or the infrared absorbing glass according to claim 13, wherein the binder resin is a UV curable resin binder.

15. The infrared absorbing film or the infrared absorbing glass according to claim 13, wherein a thickness of the coating layer is 1 μm or more and 10 μm or less.

16. The infrared absorbing film according to claim 13, wherein the transparent film base material is a polyester film.

17. The infrared absorbing film or the infrared absorbing glass according to claim 13, wherein a content of the infrared absorbing fine particles contained in the coating layer per unit projected area is 5.0 g/m² or more and 7.0 g/m² or less.

18. A method for producing infrared absorbing fine particles, comprising:
   dropping an alcohol solution in which an antimony compound is dissolved and an alkaline solution in parallel into a solution of a tin compound having a liquid temperature of 60° C. or more and less than 70° C., to thereby generate and precipitate a hydroxide containing tin and antimony;
   repeating decantation on the precipitate and washing it until conductivity of a supernatant liquid of a washing liquid in the decantation becomes 1 mS/cm or less;
   placing the washed precipitate into the alcohol solution and stirring it to thereby perform wet-treatment so as to obtain a wetted product;
   drying the wet-treated product to thereby obtain an antimony-containing tin oxide (ATO) infrared absorbing fine particle precursor; and
   heating the ATO infrared absorbing fine particle precursor at 700° C. or more and less than 850° C. in an air atmosphere and firing it for 1 hour or more and 5 hours or less to thereby obtain ATO infrared absorbing fine particles, wherein
   in the ATO fine particles, Sn element is contained in a concentration of 66.0 mass % or more and 70.0 mass % or less and Sb element is contained in a concentration of 8.0 mass % or more and 9.0 mass % or less, and a value obtained by a volume resistivity measurement performed to a green compact of the ATO fine particles is 0.05 Ω·cm or more and 0.35 Ω·cm or less.

19. The method for producing infrared absorbing fine particles according to claim 18, wherein in the generating and precipitating the hydroxide containing tin and antimony, a solution of 100 parts by weight of a tin compound in terms of tin (IV) oxide and an alcohol solution in which 9.0 parts by weight or more and 11.0 parts by weight or less of an antimony compound is dissolved in terms of element of antimony are dropped in parallel, into the alkaline solution having a liquid temperature of 60° C. or more and less than 70° C.

* * * * *